(No Model.) 2 Sheets—Sheet 1.
B. F. BEARD.
SELF MEASURING FAUCET.
No. 557,538. Patented Apr. 7, 1896.
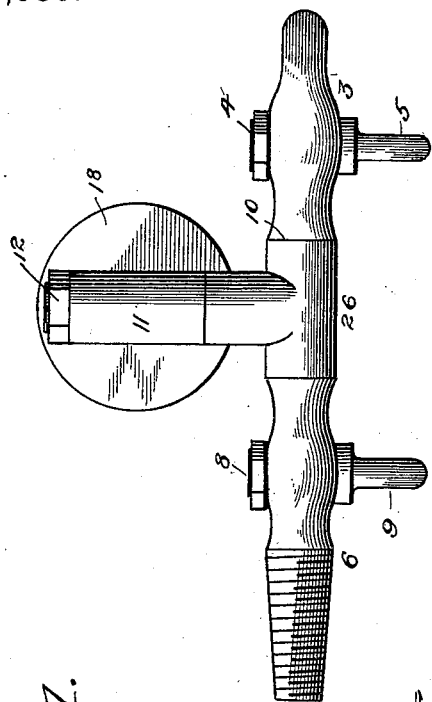
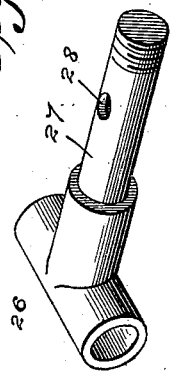
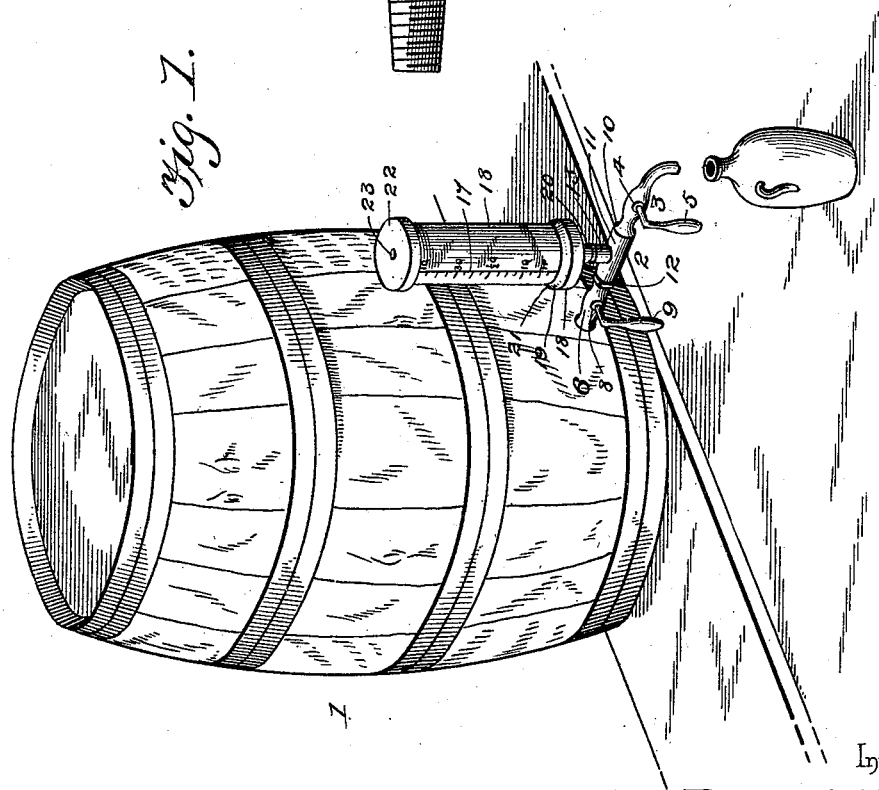
Witnesses
T. H. Monroe.
R. M. Smith.
Inventor
Benjamin F. Beard
By his Attorneys,
C. A. Snow & Co.
ANDREW B.GRAHAM, PHOTO-LITHO. WASHINGTON,D.C.

(No Model.) 2 Sheets—Sheet 2.
B. F. BEARD.
SELF MEASURING FAUCET.
No. 557,538. Patented Apr. 7, 1896.
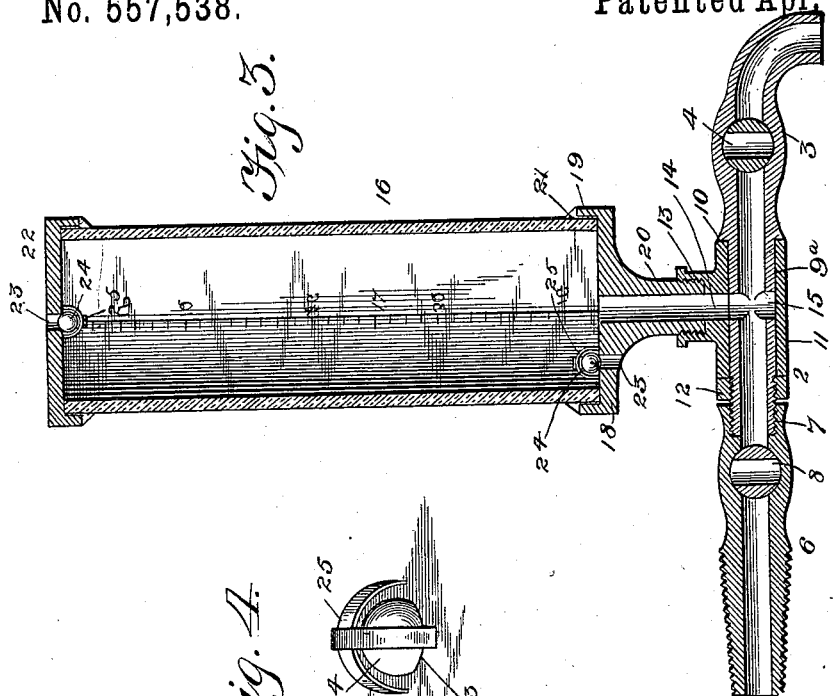
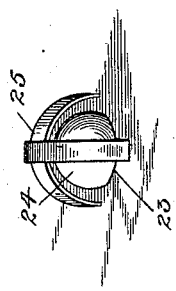
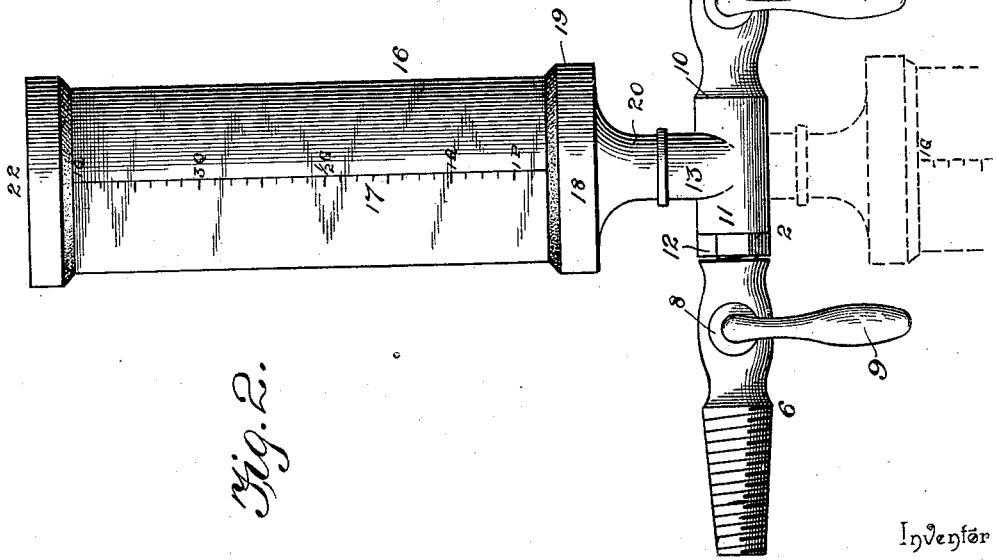
Inventor
Benjamin F. Beard
Witnesses
E. H. Monroe
R. M. Smith
By his Attorneys,
C. A. Snow & Co.

UNITED STATES PATENT OFFICE.

BENJAMIN F. BEARD, OF PINE BLUFF, ARKANSAS.

SELF-MEASURING FAUCET.

SPECIFICATION forming part of Letters Patent No. 557,538, dated April 7, 1896.

Application filed May 31, 1895. Serial No. 551,232. (No model.)

*To all whom it may concern:*

Be it known that I, BENJAMIN F. BEARD, a citizen of the United States, residing at Pine Bluff, in the county of Jefferson and State of Arkansas, have invented a new and useful Self-Measuring Faucet, of which the following is a specification.

This invention relates to an improvement in self-measuring faucets, and has for its object to provide a simple and inexpensive construction of measuring-faucet which may be quickly and easily taken apart and cleaned and which will measure accurately the desired amount of liquid preparatory to conducting the same into the receiving vessel.

A further object of the invention is to construct the measuring vessel or reservoir and connect it with the stem of the faucet in such manner that it may be arranged either above or below the stem of the faucet, as desired or found necessary.

Other objects and advantages of the invention will appear in the course of the subjoined description.

To accomplish the objects above named, the invention consists in a self-measuring faucet having novel features and details of construction and arrangement of parts, whereby certain advantages in point of simplicity and efficiency are attained, as hereinafter fully described, illustrated in the drawings, and finally embodied in the claims.

In the accompanying drawings, Figure 1 is a perspective view of a self-measuring faucet constructed in accordance with this invention and shown applied to a liquid-containing barrel or cask. Fig. 2 is an enlarged side elevation of the self-measuring faucet complete, showing in dotted lines how the liquid-containing vessel or reservoir may be inverted. Fig. 3 is a vertical longitudinal section through the same. Fig. 4 is an enlarged detail view of one of the self-acting valves of the liquid vessel or reservoir. Fig. 5 is a plan view of the complete faucet, showing the measuring vessel mounted upon a T-piece or lateral extension from the main stem of the faucet. Fig. 6 is a detail perspective view of the T-piece or extension.

Similar numerals of reference designate corresponding parts in the several figures of the drawings.

Referring to the accompanying drawings, 1 designates a cask or barrel to which the improved self-measuring faucet (indicated at 2) is applied. This faucet comprises an outer or nozzle portion 3, having a downwardly-opening spout and provided with an ordinary plug-valve 4, having a suitable operating-handle 5, preferably arranged at one side of the faucet. The faucet also comprises a screw-plug portion 6, which is provided at its front end with an internally-threaded socket 7 for the reception of the threaded rear end of the stem of the nozzle portion 3. This screw-plug section is screwed into the bung-hole of the barrel or cask and serves to support the other parts of the measuring-faucet. The screw-plug portion is also provided with a plug-valve 8, having an operating-handle 9, arranged preferably upon the same side of the faucet as the other operating-handle, 5.

The stem of the nozzle portion is reduced in diameter, as indicated at $9^a$, and also formed with a shoulder 10, thus providing for the reception of a sleeve or collar 11, which surrounds said stem snugly and butts against the shoulder 10. This sleeve or collar is held snugly in place and prevented from turning by means of a jam-nut 12 engaging the threaded end of the stem, as shown. The sleeve or collar 11 is provided with an extension 13 at right angles thereto, which is formed with a central perforation 14, adapted to register with either one of an oppositely-disposed pair of perforations 15 in the stem of the nozzle 14, according to the position into which said sleeve or collar is turned.

16 designates the measuring vessel, which is composed in the main of a glass cylinder, the same being provided with a graduated scale 17, with which to indicate the amount of liquid contained therein. Two of such scales are represented upon the glass cylinder, such scales extending in reverse directions, so that, no matter whether the measuring vessel is thrown up or down, one of the scales will read correctly and indicate the amount of liquid in the measuring vessel.

18 designates the inner head of the measuring vessel, which is formed or cast from metal, and provided with an annular flange 19, adapted to embrace the corresponding end of the glass cylinder. This head has a screw-threaded neck or extension 20, by means of which it is connected to the extension 13 of the sleeve or collar 11, above described, surrounding the nozzle portion of the faucet.

21 indicates a filler, which is composed of some sealing agent or cement, which surrounds the glass cylinder adjacent to the flange 19 and between the inner face of said flange and the outer face of the glass cylinder. The cylinder is also provided with an outer metallic head 22, having an annular flange surrounding said cylinder and sealed thereto in a manner similar to that just described. Each of the heads 18 and 22 is provided with a perforation 23, within which is arranged a ball-valve 24, held in place by means of a cage 25, comprising two metallic wickets or staples disposed at right angles to each other and crossing each other centrally, as shown, and soldered or otherwise secured to the inner face of the head.

Referring to Figs. 5 and 6, 26 designates a T or extension piece, which may be placed upon the stem of the faucet instead of the sleeve or collar 11, as above described. When so placed upon the stem, such T-piece or extension projects from the stem at right angles and being reduced, as indicated at 27, is adapted to receive the sleeve or collar 11, which carries the measuring vessel. This T-piece or extension is perforated, as indicated at 28, to communicate with the interior of the measuring vessel and to enable the latter to communicate with the measuring-faucet between the valves thereof. In order to hold the sleeve or collar 11 snugly in place upon the T-piece or extension, I place the jam-nut 12 upon the outer end or extremity thereof, as shown in Fig. 5.

By means of the construction above described, and with the measuring-chamber arranged as shown in Fig. 1, when it is desired to draw a certain amount of liquid from the barrel, the inner handle 9 is operated for opening the valve 8, when the liquid will flow into the measuring vessel. When the liquid has reached the desired point or mark thereon, such valve is closed and the nozzle-valve opened, when the liquid will flow out into the receiving vessel placed beneath the mouth of the nozzle. Should the liquid in the barrel become too low to rise to the desired point in the measuring vessel, such vessel may be inverted, as indicated in dotted lines in Fig. 2, after which the reverse scale, hereinabove described, may be used for indicating the amount of liquid desired. This may be accomplished by loosening the jam-nut 12, which will leave the sleeve 11 free to turn. When in the desired position, by turning the nut 12 the measuring vessel may be firmly held. It will be apparent that in whichever position the measuring vessel may be—that is, whether it is above or beneath the faucet—the lower ball-valve will seat itself, while the upper one will drop away from its perforation as far as the cage will permit. This allows for the escape and admission of air to take the space unoccupied by the liquid, while the lower valve will prevent any of the liquid from escaping from the measuring vessel.

A self-measuring faucet constructed as herein described is capable of being quickly and easily cleaned by reason of the several parts being easily separable and accessible. It is accurate and will measure correctly all kinds of liquids without regard to their density, measuring heavy syrups and oils as correctly as the lighter liquids. Applied to metal tanks containing volatile liquids—such as coal-oil, turpentine, gasolene, benzin, &c.—all loss by evaporation will be avoided, and as a result a considerable saving effected over the open-topped pump-tanks now in general use. If desired, the T-piece or extension 26 may have the collar 11 and extension 13 formed integrally or rigidly connected therewith, in which case the position of the measuring-chamber may be changed by turning the sleeve of the T-piece or extension 26 upon the stem of the faucet in a manner easily understood.

Changes in the form, proportion, and minor details of construction may be resorted to without departing from the spirit or sacrificing any of the advantages of this invention.

Having thus described the invention, what is claimed as new, and desired to be secured by Letters Patent, is—

1. In a self-measuring faucet, the combination with the stem of the faucet proper having the single through bore or passage, of independent inlet and outlet valves controlling said passage, and a measuring vessel having direct communication with said stem at a point intermediate said valves and journaled upon the stem so as turn partially around the same and be capable of being adjusted into a position either above or beneath said stem, said measuring vessel being in communication with the stem in both its raised and lowered positions, substantially as specified.

2. A self-measuring faucet comprising a nozzle portion, a stem formed integrally therewith and screw-threaded at its extremity, a screw-plug portion adapted to be connected therewith, a valve in each of said portions, a measuring vessel having a sleeve or collar adapted to surround the stem of the nozzle portion, and a jam-nut for binding and holding said sleeve or collar with relation to the faucet, substantially as described.

3. A self-measuring faucet comprising a nozzle portion having a valve and a threaded stem, screw-plug portion also having a valve and capable of being coupled to the stem of the nozzle portion, and a measuring vessel having a collar or sleeve surrounding said stem and communicating therewith between the said valves, substantially as specified.

In testimony that I claim the foregoing as my own I have hereto affixed my signature in the presence of two witnesses.

BENJAMIN F. BEARD.

Witnesses:
T. W. SPARKS,
S. G. T. KNOX.